(12) United States Patent
Park

(10) Patent No.: US 6,382,544 B1
(45) Date of Patent: May 7, 2002

(54) FISHING REEL

(75) Inventor: Chang-Ho Park, Changwon (KR)

(73) Assignee: Yong Mar Engineering Co., Ltd., Kyungsangnam-Do (KR)

( * ) Notice: Subject to any disclaimer, the term of this patent is extended or adjusted under 35 U.S.C. 154(b) by 0 days.

(21) Appl. No.: 09/555,067

(22) PCT Filed: Jan. 20, 1999

(86) PCT No.: PCT/KR99/00035

§ 371 Date: May 24, 2000

§ 102(e) Date: May 24, 2000

(87) PCT Pub. No.: WO00/19814

PCT Pub. Date: Apr. 13, 2000

(30) Foreign Application Priority Data

Oct. 8, 1998 (KR) .............................................. 98-41916

(51) Int. Cl.[7] ..................... A01K 89/016; A01K 89/033
(52) U.S. Cl. .................... 242/303; 242/295; 242/306; 242/318
(58) Field of Search ................................ 242/307, 302, 242/303, 317, 318, 295

(56) References Cited

U.S. PATENT DOCUMENTS

| | | | | |
|---|---|---|---|---|
| 2,436,422 A | * | 2/1948 | Dashmann | 242/318 |
| 2,448,610 A | * | 9/1948 | Mandolf | 242/318 |
| 2,993,660 A | * | 7/1961 | Parks | 242/318 |
| 3,510,083 A | * | 5/1970 | Cook | 242/301 |
| 3,526,370 A | * | 9/1970 | Arsenault | 242/318 |
| 3,806,060 A | * | 4/1974 | Valentine | 242/301 |
| 5,590,547 A | | 1/1997 | Ament | |
| 5,615,840 A | | 4/1997 | Bushnell et al. | |
| 6,010,087 A | * | 1/2000 | Merrill et al. | 242/318 |
| 6,155,508 A | * | 12/2000 | Lepage | 242/303 |

FOREIGN PATENT DOCUMENTS

WO    A-9419937    9/1994

* cited by examiner

Primary Examiner—Katherine A. Matecki
(74) Attorney, Agent, or Firm—Birch, Stewart, Kolasch & Birch, LLP

(57) ABSTRACT

In a fishing reel, a spool (200) can be easily and firmly assembled with a housing (100) and is not unexpectedly separated from the housing after assembled, and the rotation of the spool in one direction can be braked without moving a main shaft (110) relative to the housing. The fishing reel has a housing and a spool. A main shaft is fixed to a hub (130) of the housing. The spool has a winding drum (210) disposed at a center thereof. The winding drum contains a one-way clutch integrally fixed thereto. A sleeve surrounds a central portion of the main shaft with being in contact with the central portion. The sleeve is fitted in the one-way clutch and permitted to rotate in only one direction by the one-way clutch when the spool has been assembled with the housing. The spool can rotate in only one direction relative to the housing when the frictional force between the main shaft and the sleeve is adjusted to be maximum. The spool can rotate in either direction more freely as the frictional force is decreased.

11 Claims, 5 Drawing Sheets

FISHING REEL

This application is the national phase under 35 U.S.C. § 371 of PCT International Application No. PCT/KR 99/00035 which has an International filing date of Jan. 20, 1999, which designated the United States of America.

TECHNICAL FIELD

The present invention relates to a fishing equipment, and more particularly to a fishing reel, in which a spool can be easily and firmly assembled with a housing and is not unexpectedly separated from the housing after assembled, and the rotation of the spool in one direction can be braked without moving a main shaft relative to the housing.

BACKGROUND ART

A fishing reel is a well-known equipment for winding the fishing line thereon. In general, the conventional fishing reel has a spool for winding the fishing line thereon and a housing for rotatably supporting the spool.

There have been many kinds of prior fishing reels for improving various characteristics of the fishing reel structure. For example, U.S. Pat. No. 5,590,847 issued to Ament discloses a fly reel with adjustable brake assembly for the purpose of storing and adjustably dispensing fishing line. However, Ament's fishing reel requires a separate brake plate, which enlarges the entire volume of the fishing reel and is apt to be out of order because it is interposed between the main housing and the spool. Further, in Ament's fishing reel, the spool may be unexpectedly separated from the main housing, and various parts in relation to the center axle are subject to relatively large friction, because the center axle is rotated and moved forward and backward during adjusting the brake assembly.

U.S. Pat. No. 5,615,840 issued to Bushnel et. al. discloses a fly reel with a drag system. Bushnel et. al.' fishing reel also has similar problems of Ament's fishing reel. Furthermore, Bushnel et. al.' fishing reel is very difficult to manufacture and increases its manufacturing cost because it has very complicated construction such as a drag spreader, a drag expander, a spur gear, etc. which do not perform relatively superior drag function.

While the above fishing reels fulfill their objectives and requirements, the above mentioned patens and other prior arts in the applicant's knowledge do not disclose a fishing reel, in which a spool can be easily and firmly assembled with a housing and is not unexpectedly separated from the housing after assembled, and the rotation of the spool in one direction can be braked without moving a main shaft relative to the housing.

DISCLOSURE OF INVENTION

In view of the foregoing disadvantages inherent in the known types of fishing reels now present in the prior art, the present invention provides a new fishing reel wherein the same can be utilized. As such, the general purpose of the present invention, which will be described subsequently in greater detail, is to provide a new fishing reel which has many of the advantages of the fishing reels mentioned heretofore and many novel features that result in a fishing reel which is not anticipated, rendered obvious, suggested, or even implied by any of the prior art fishing reels, either alone or in any combination thereof.

In more detailed description, it is an object of the present invention to provide a fishing reel, in which a spool can be easily and firmly assembled with a housing and is not unexpectedly separated from the housing after assembled.

It is another object of the present invention to provide a fishing reel, in which the rotation of the spool in one direction can be braked without moving a main shaft relative to the housing, thereby greatly decreasing the possibility that the spool and the housing may be unexpectedly separated from each other.

To achieve the above objects, the present invention provides a fishing reel comprising: a housing having a hub disposed at a center of the housing; a spool having a winding drum disposed at a center of the spool, the winding drum containing a one-way clutch integrally fixed to the winding drum; a main shaft fixed to the hub; a sleeve surrounding a central portion of the main shaft, the sleeve being in contact with the central portion of the main shaft; a first means for assembling the spool with the housing, the sleeve being fitted in the one-way clutch, the sleeve being permitted to rotate in only one direction by the one-way clutch when the spool has been assembled with the housing; a second means for adjusting a frictional force between the main shaft and the sleeve, the spool being capable of rotating in only one direction relative to the housing when the frictional force is maximum, the spool being capable of rotating in either direction more freely as the frictional force is decreased.

Preferably, the first means comprises an assembling pin, an assembling pin spring for applying a rotational biasing force to the assembling pin, and an engaging groove formed near a front end of the main shaft. The spool is assembled with and separated from the housing respectively when the assembling pin is engaged with and disengaged from the engaging groove.

The main shaft includes a head disposed at the front end of the main shaft and a neck for forming the engaging groove after the head, the assembling pin including a core shaped like a cam, a lever extending outward from the core, and a hook formed at one side of a middle portion of the lever, the head and the neck of the main shaft completely passing through the winding drum of the spool when the spool is assembled with the housing, the hook being disengaged from the neck when the lever is pivoted in a first pivoting direction, the assembling pin spring pivoting the lever in a second pivoting direction so as to make the hook be engaged with the neck when the lever is released, the second pivoting direction being opposite to the first pivoting direction.

More preferably, the hook comprises two fingers protruding from the lever and a semi-circular circumference between the two fingers, so that the two fingers and the semi-circular circumference surround at least half of the neck to prevent the hook from being disengaged from the neck.

The second means comprises an adjusting knob and a plurality of plungers, the main shaft further comprises a shoulder at a middle portion after the neck, the sleeve being disposed between the shoulder and a front surface of the hub, the adjusting knob being fitted around the screw-thread at a rear portion of the screw-thread after the nut, the plungers extending through the hub and being urged backward by biasing force of plunger springs, the adjusting knob pushing the sleeve by means of the plungers so as to increase a frictional force between the sleeve and the shoulder when the adjusting knob is rotated along the screw-thread in a first rotational direction, the plungers being pushed back by the plunger springs so as to decrease the frictional force when the adjusting knob is rotated along the screw-thread in a second rotational direction.

BRIEF DESCRIPTION OF DRAWINGS

The above object, and other features and advantages of the present invention will become more apparent by describing in detail preferred embodiments thereof with reference to the attached drawings, in which.

BEST MODE FOR CARRYING OUT THE INVENTION

Hereinafter, a fishing reel 10 according to one embodiment of the present invention will be described in detail with reference to the drawings.

Figure 1:
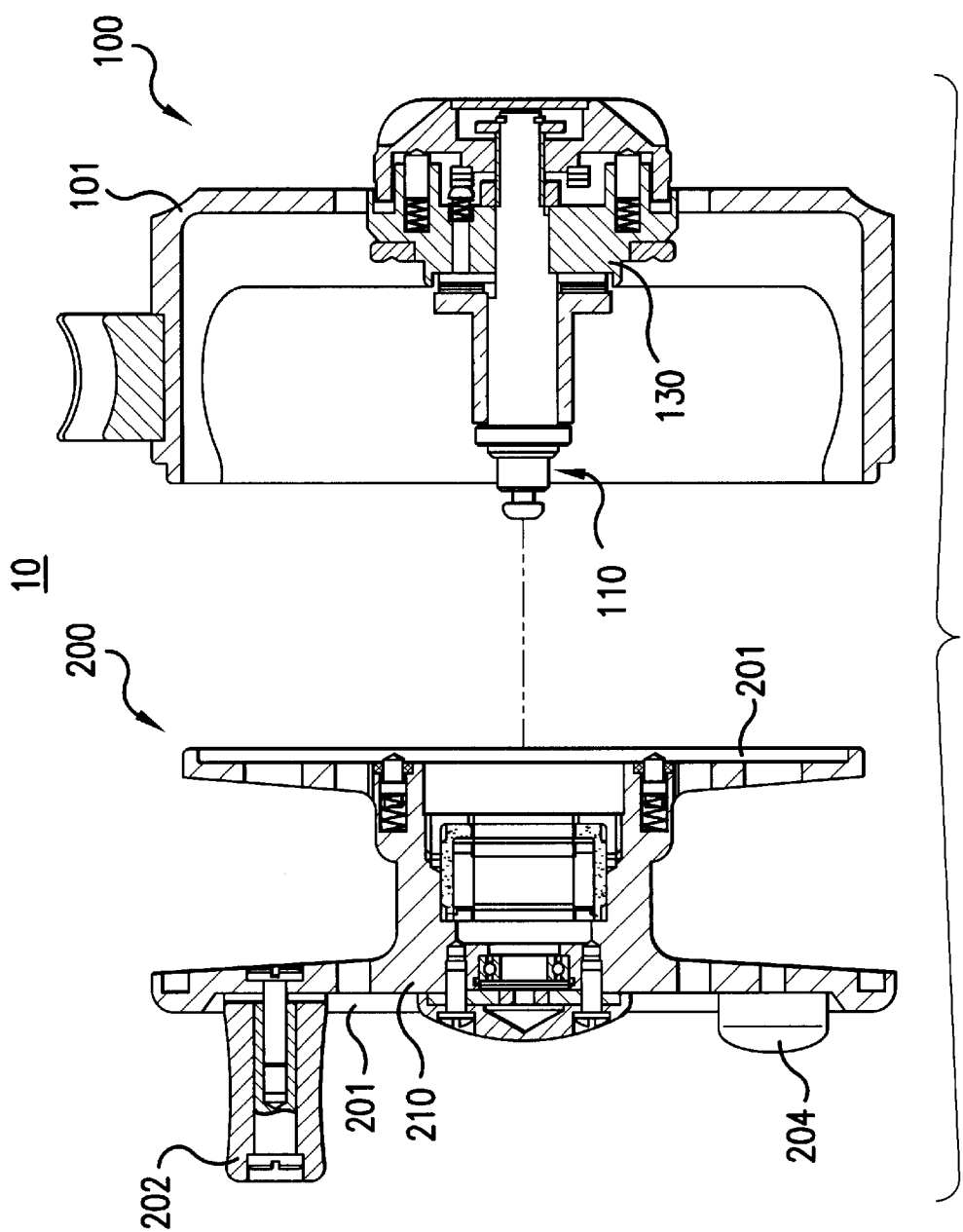
FIG. 1 is an exploded sectional view of a fishing reel according to one embodiment of the present invention.

FIG. 1 is an exploded sectional view of the fishing reel 10 according to one embodiment of the present invention. As shown, the fishing reel 10 includes a housing 100 and a spool 200. The housing 100 partially surrounds and rotatably supports spool 200.

The housing 100 includes a hub 130, a housing disc 101, and a main shaft 110. The hub 130 is disposed at the center of the housing 100. The housing disc 101 surrounds and is attached integrally to the hub 130. The main shaft 110 is fixed to and inserted through the hub 130.

The spool 200 includes a winding drum 210 and a pair of spool discs 201. The winding drum 210 is disposed at the center of the spool 200, and the two spool discs 201 are respectively attached integrally to either sides of the winding drum 210. A winding knob 202 and a balance 204 are fixed to an outer surface of one of the two spool discs 201, diametrically opposed to each other.

Figure 2:
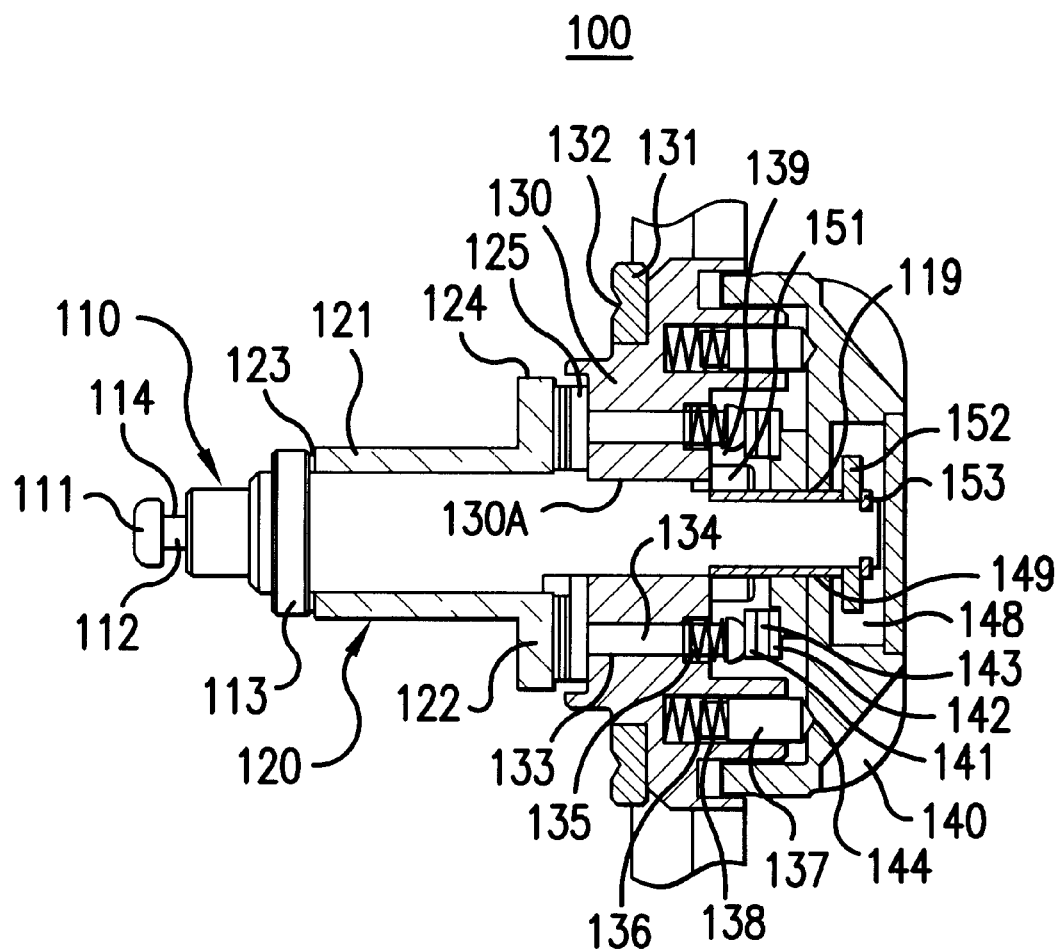
FIG. 2 is an enlarged view of a part of the housing employed in the fishing reel shown in FIG. 1.

FIG. 2 is an enlarged view of a part of the housing 100. In the following description, the directions are indicated on a basis that the front side means the left side of the drawing while the back side means the right side of the drawing. As shown, the hub 130 has a hub through hole 130a formed through the center of the hub 130, and the main shaft 110 is inserted through the hub through hole 130a in such a manner that a rear portion of the main shaft 110 is positioned in the hub through hole 130a.

An annular drag plate 131 is fixedly attached to a peripheral portion of the front surface of the hub 130. The drag plate 131 has a plurality of second dents 132 formed in an annular arrangement on the front surface of the drag plate 131. When the housing 100 and the spool 200 have been assembled with each other, second click pins 212 of the spool 200 are engaged with the second dents 132.

The hub 130 has a first recess 139 and two first click pin holes 136. The first recess 139 is formed at the center of the rear surface of the hub 130, and the two first click pin holes 136 are formed outside of the first recess 139 at the rear surface of the hub 130 diametrically opposed to each other. Each first click pin hole 136 contains a first click pin spring 138 and a first click pin 137 urged backward by the biasing force of the first click pin spring 138. The hub 130 further has three plunger through holes 133 extending through the hub 130 from the bottom of the first recess 139. Each plunger through hole 133 contains a plunger 134 urged backward by a plunger spring 135.

In the meantime, the main shaft 110 has a head 111, a neck 112, a shoulder 113 and a screw-thread 119. The head 111 is formed at the front end of the main shaft 110. The neck 112, which has a diameter smaller than that of the head 111, is integrally connected to the back of the head 111, thereby forming an engaging groove 114 after the head 111. The shoulder 113 has a diameter larger than that of the remaining parts of the main shaft 110 and is formed at a predetermined position after the neck 112 of the main shaft 110. The screw-thread 119 is formed forward from the rear end of the main shaft 110 at the outer cylindrical surface of the main shaft 110. The main shaft 110 is inserted through the hub through hole 130a of the hub 130 and fixedly held by a nut 151. The nut 151 is fitted around the screw-thread 119 at the front end of the screw-thread 119 with being in close contact with the rear surface of the hub 130.

A sleeve 120 is fitted between the shoulder 113 of the main shaft 110 and the front surface of the hub 130. The sleeve 120 has a cylindrical tube 121 and a flange 122. The flange 122 is integrally connected to and extends radially outward from the rear end of the cylindrical tube 121. A central portion of the main shaft 110 is fitted in the cylindrical tube 121 of the sleeve 120, so that the shoulder 113 and the hub 130 prevent the sleeve 120 from moving forward and backward. A first washer 123 is interposed between the shoulder 113 of the main shaft 110 and the front end of the cylindrical tube 121 so as to increase the frictional force between them. Meanwhile, an annular disc plate 124 and a second washer 125 respectively surrounding the main shaft 110 are interposed between the flange 122 and the front surface of the hub 130 so as to increase the frictional force between the flange 122 and the front surface of the hub 130, thereby preventing the hub 130 and the plungers 134 from sliding on the flange 122.

An adjusting knob 140 is fitted around the screw-thread 119 at a rear portion of the screw-thread 119 after the nut 151. A second recess 148 is formed at the center of the rear surface of the adjusting knob 140. A knob through hole 149 extends through the adjusting knob 140 at the bottom center of the second recess 148. The knob through hole 149 has an inner screw-thread formed at the inner cylindrical surface of the knob through hole 149, with which the screw-thread 119 of the main shaft 110 is engaged, so that the adjusting knob 140 can be moved forward and backward by rotating the adjusting knob 140 along the screw-thread 119 of the main shaft 110.

A plurality of first dents 144 are formed in an annular arrangement at the front surface of the adjusting knob 140. The first click pins 137 of the hub 130 are engaged with the first dents 144. A third washer 141, a wave washer 143, and a fourth washer 142 are arranged in series between the plungers 134 inserted through the plunger through holes 133 of the hub 130 and the inner surface of the adjusting knob 140. When the adjusting knob 140 is tightened up, the wave washer 143 is elastically deformed in the axial direction of the housing 100, so as to increase the force transferred in the axial direction between the adjusting knob 140 and the plunger 134.

The second recess 148 of the adjusting knob 140 contains a stopper washer 152 fitted around the screw-thread 119 of the main shaft 110 at the rear end of the screw-thread 119. The stopper washer 152 is fixedly held at its position by a retainer 153 and limits the movement of the adjusting knob 140 in the axial direction.

Figure 3:
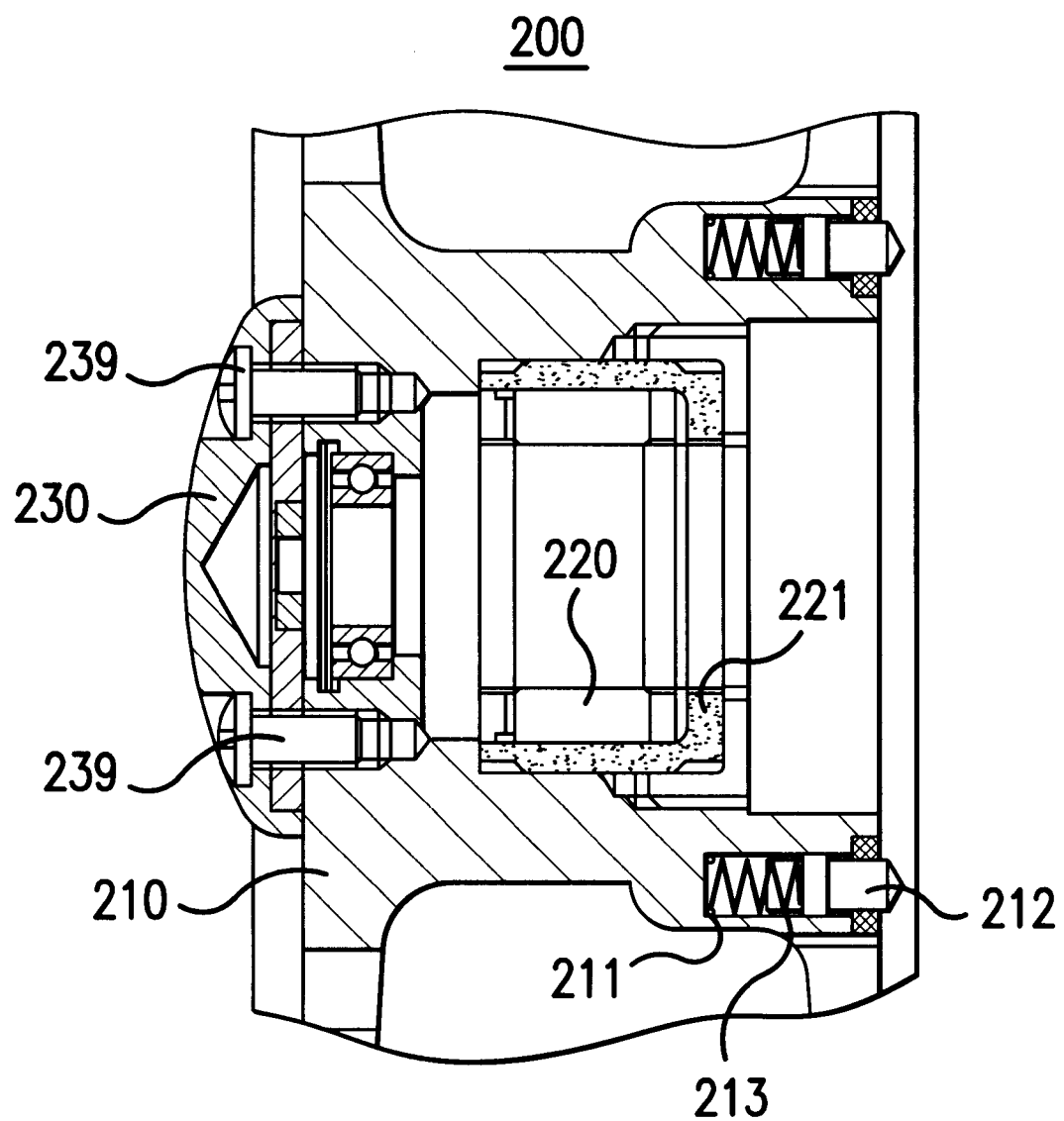
FIG. 3 is an enlarged view of a part of the spool employed in the fishing reel shown in FIG. 1.

FIG. 3 is an enlarged view of a part of the spool 200. Also in the following description, the directions are indicated on the same basis with that in the description about FIG. 2, that is, the front side means the left side of the drawing while the back side means the right side of the drawing.

As shown, the winding drum 210 of the spool 200 contains a one-way clutch 220 which is integrally fixed to the inner cylindrical surface of the winding drum 210 by a clutch nut 221. When the housing 100 and the spool 200 are assembled with each other, the sleeve 120 of the housing 100 is received in the one-way clutch 220 with being in close contact with the one-way clutch 220, so that the one-way clutch 220 permits the sleeve 120 to relatively rotate or slide in only one direction.

Second click pin holes 211 are formed at the back surface of the winding drum 210. Each second click pin hole 211 contains a second click pin spring 213 and a second click pin 212 urged backward by a biasing force of the second click pin spring 213. A cap 230 is assembled on the front surface of the winding drum 210 by fixing screws 239. The cap 230 covers up an assembling pin 240 as shown in FIGS. 4 and 5.

Figure 4:
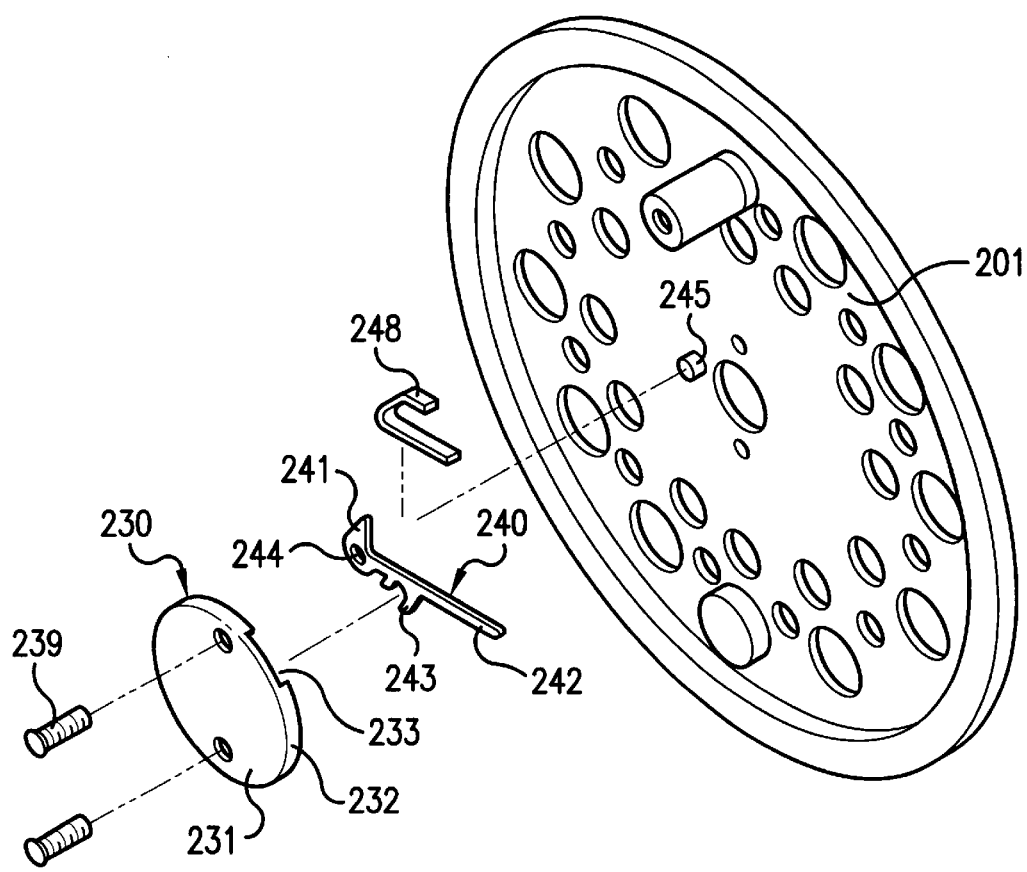
FIG. 4 is an exploded perspective view of several parts including a cap, an assembling pin, and an assembling pin spring employed in the fishing reel shown in FIG. 1.

FIG. 4 is an exploded perspective view of the cap 230, and the assembling pin 240 and an assembling pin spring 248 disposed in the cap 230. As shown, the cap 230 includes a ceiling 231 shaped like a dome and a cylindrical side wall 232 integrally connected to the circumference of the ceiling 231. A part of the cylindrical side wall 232 is cut out to form a gate 233.

The assembling pin 240 includes a core 241 shaped like a cam, a lever 242 extending outward from the core 241, and a hook 243 formed at one side of a middle portion of the lever 242. The hook 243 has two fingers 243a protruding from the lever 242 and a semi-circular circumference 243b between the two fingers 243a, so that the two fingers 243a and the semi-circular circumference 243b sufficiently surround a part of any cylindrical body enough to prevent the cylindrical body from being disengaged from the hook 243. The core 241 has a pivot hole 244 formed at the center of the core 241.

Figure 5:
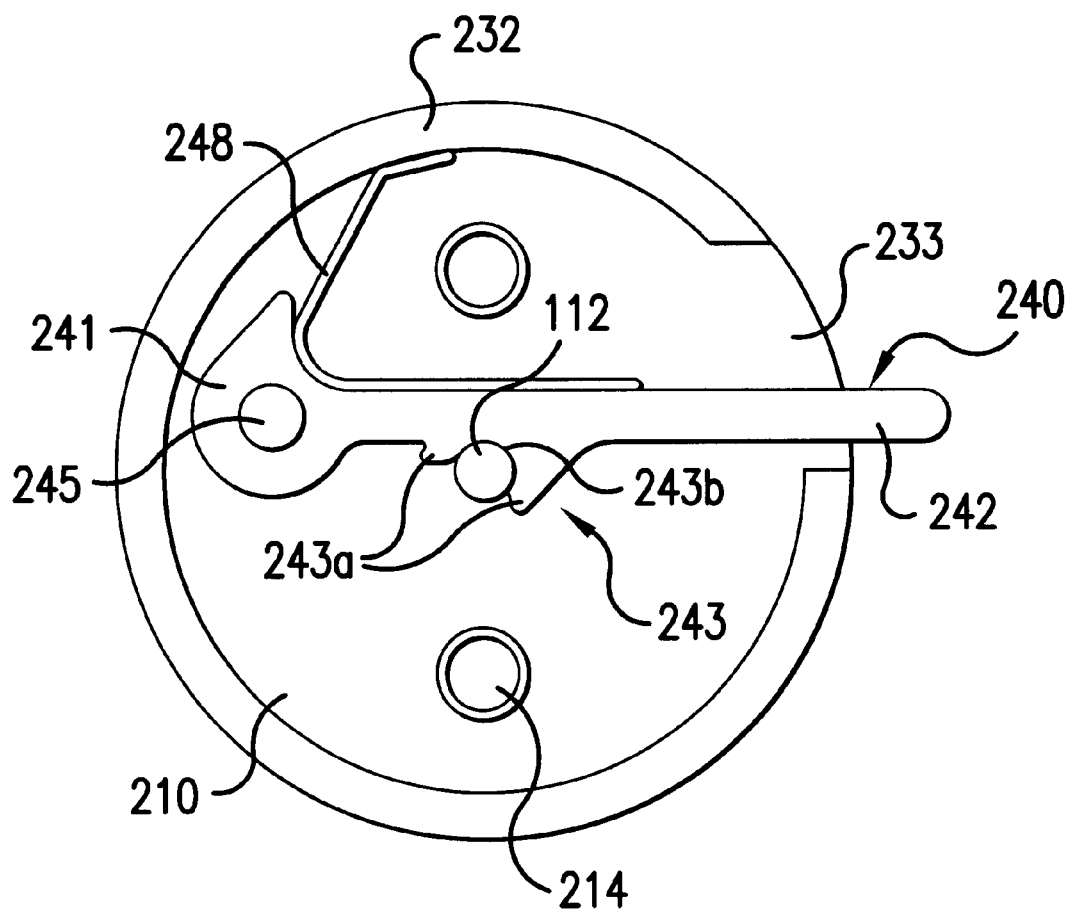
FIG. 5 is a partly enlarged sectional view for showing the installation of the assembling pin on the front surface of the winding drum shown in FIG. 4.

FIG. 5 is a partly enlarged sectional view for showing the installation of the assembling pin 240 on the front surface of the winding drum 210 in the cap 230. As shown, the pivot pin 245 is provided at the front surface of the winding drum 210, and the assembling pin 240 is installed pivotal about the pivot pin 245 on the front surface of the winding drum 210. The assembling pin 240 is urged by a biasing force of an assembling pin spring 248 which is held between the cylindrical side wall 232 of the cap 230 and the core 241. The lever 242 of the assembling pin 240 protrudes out of the cap 230 through the gate 233 of the cap 230. When the lever 242 is operated, the assembling pin 240 pivots about the pivot pin 245 to make the hook 243 be engaged with or disengaged from the neck 112 of the main shaft 110.

Hereinafter, the operation of the fishing reel 10 according to an embodiment the present invention as above will be described in detail.

At first, when the housing 100 and the spool 200 respectively combined as shown in FIG. 1 are assembled together, the main shaft 110 of the housing 100 is inserted into the winding drum 210 of the spool 200 in a state that the lever 242 of the assembling pin 240 has been pivoted counterclockwise in FIG. 5.

When the head 111 and the neck 112 of the main shaft 110 are located in the cap 230 after completely passing the winding drum 210 of the spool 200, the lever 242 is released. Then, the lever 242 is pivoted clockwise in FIG. 5 by the assembling pin spring 248, so that the hook 243 of the assembling pin 240 is inserted in the engaging groove 114 of the main shaft 110 and engaged with the neck 112. In this case, since the hook 243 surrounds at least a half of the cylindrical wall of the neck 112, the engagement between the hook 243 and the head 111 of the main shaft 110 is very firm, that is, the housing 100 and the spool 200 are not separated from each other without pivoting the assembling pin 240 counterclockwise. The construction of the hook 243 having the semi-circular circumference 243b between the two fingers 243a completely prevents the hook 243 of the assembling pin 240 from being disengaged from the neck 112 of the main shaft 110.

On the other hand, when the assembled housing 100 and spool 200 are separated from each other, the user pivots the lever 242 of the assembling pin 240 counterclockwise in FIG. 5 to release the engagement between the hook 243 of the assembling pin 240 and the neck 112 of the main shaft 110, and then the user draws the main shaft 110 of the housing 100 out of the winding drum 210.

In the meantime, the fishing line can be wound around or unwound from the winding drum 210 by holding the winding knob 202 and rotating the spool 200 in a state that the housing 100 and the spool 200 are assembled together.

In this state, when the adjusting knob 140 is rotated in a direction of the right-handed screw to be tightened, the adjusting knob 140 advances forward or leftward in FIG. 2 along the screw-thread 119 of the main shaft 110, with pushing the plungers 134 forward by means of the fourth washer 142, the wave washer 143, and the third washer 141. Then, the plungers 134 push the sleeve 120 forward by means of the second washer 125 and the disc plate 124, so that the sleeve 120 exerts strong pressure on the shoulder 113 of the main shaft 110 with compressing the first washer 123. In this case, because the nut 151 prevents the main shaft 110 from moving forward, a strong friction is generated between the shoulder 113 and the sleeve 120 via the first washer 123.

When the adjusting knob 140 is completely tightened, the main shaft 110 and the sleeve 120 can not perform a relative rotation to each other but rotate together as one incorporated body. In this case, because the sleeve 120 can be rotated in only one direction relative to the one-way clutch 220 as described above, the winding drum 210 fixedly surrounding the one-way clutch 220 can be rotated in only one direction relative to the sleeve 120 fastened to the main shaft 110 fixed to the housing 100. Therefore, the spool 200 can be rotated in only one direction relative to the housing 100, so as to prevent the fishing line from being unwound from the spool 200.

Meanwhile, when the adjusting knob 140 is rotated in a direction of the left-handed screw to be loosened, the adjusting knob 140 retreats backward or rightward in FIG. 2 along the screw-thread 119 of the main shaft 110, so that the plungers 134 return backward by the biasing force of the plunger springs 135. The retreat of the plungers 134 decreases the force of pressing the sleeve 120 forward, thereby decreasing the friction via the first washer 123 between the sleeve 120 and the shoulder 113. Therefore, the sleeve 120 can slide around the main shaft 110 and can be rotated freely in either way relative to the main shaft 110. In other words, the spool 200 can be rotated freely in either way relative to the housing 100, so that the fishing line can be freely wound around or unwound from the spool 200.

The more the adjusting knob 140 is tightened, the stronger the friction between the sleeve 120 and the shoulder 113 via the first washer 123 becomes, so that the force for preventing the spool 200 from rotating is strengthened. When the adjusting knob 140 is completely tightened, the fishing line is prevented from being unwound from the spool 200 as described above.

On the contrary, the looser the adjusting knob 140 is released, the weaker the friction between the sleeve 120 and the shoulder 113 via the first washer 123 becomes, so that the force for preventing the spool 200 from rotating is weakened.

In the meantime, the main shaft 110 does not move forward or backward relative to the housing 100 but is firmly fixed to the housing 100 by means of the nut 151, even while the adjusting knob 140 is rotated to be tightened or loosened. Therefore, greatly decreased is the possibility of a danger that the hook 243 of the assembling pin 240 may be unexpectedly released from the neck 112 of the main shaft 110, and thereby that the spool 200 may be unexpectedly separated from the housing 100.

Further, when the adjusting knob 140 is rotated to be tightened or loosened, the first click pins 137 travel along the first dents 144 in an annular arrangement with generating pleasant sound of clicking which makes the user feel pleasant and at home. Likewise, when the spool 200 is rotated, the second click pins 212 travel along the second dents 132 with also generating pleasant sound of clicking.

In the fishing reel 10 of the present invention, the main shaft 110 does not rotate relative to the hub 130 when the adjusting knob 140 is tightened or loosened as described above. However, the rotation of the spool 200 in only one direction relative to the housing 100 is achieved by the increase of the friction between the main shaft 110 and the sleeve 120 which is caused by pressing the sleeve 120 by means of the plunger 134 extending through the hub 130 of the housing 100.

Accordingly, the present invention provides a fishing reel, in which a spool can be easily and firmly assembled with a housing and is not unexpectedly separated from the housing after assembled.

In addition, the present invention provides a fishing reel, in which the rotation of the spool in one direction can be braked without moving a main shaft relative to the housing, thereby greatly decreasing the possibility that the spool and the housing may be unexpectedly separated from each other.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A fishing reel comprising:
   a housing having a hub disposed at a center of the housing;
   a spool having a winding drum disposed at a center of the spool, the winding drum containing a one-way clutch integrally fixed to the winding drum;
   a main shaft fixed to the hub;
   a sleeve surrounding a central portion of the main shaft, the sleeve being in contact with the central portion of the main shaft;
   a first means for assembling the spool with the housing, the sleeve being fitted in the one-way clutch, the sleeve being permitted to rotate in only one direction by the one-way clutch when the spool has been assembled with the housing;
   a second means for adjusting a frictional force between the main shaft and the sleeve, the spool being capable of rotating in only one direction relative to the housing when the frictional force is maximum, the spool being capable of rotating in either direction more freely as the frictional force is decreased,
   wherein the hub has a hub through hole formed through a center of the hub, and the main shaft further has a screw-thread formed forward from a rear end of the main shaft at an outer cylindrical surface of the main shaft, the main shaft being inserted through the hub through hole and fixedly held by a nut, the nut being fitted around the screw-thread and fixed to a rear surface of the hub, and
   wherein said second means comprises an adjusting knob and a plurality of plungers, the main shaft further comprises a shoulder at a middle portion after the neck, the sleeve being disposed between the shoulder and a front surface of the hub, the adjusting knob being fitted around the screw-thread at a rear portion of the screw-thread after the nut, the plungers extending through the hub and being urged backward by biasing force of plunger springs, the adjusting knob pushing the sleeve by means of the plungers so as to increase a frictional force between the sleeve and the shoulder when the adjusting knob is rotated along the screw-thread in a first rotational direction, the plungers being pushed back by the plunger springs so as to decrease the frictional force when the adjusting knob is rotated along the screw-thread in a second rotational direction.

2. A fishing reel as claimed in claim 1, wherein said first means comprises an assembling pin, an assembling pin spring for applying a rotational biasing force to the assembling pin, and an engaging groove formed near a front end of the main shaft, the spool being assembled with and separated from the housing respectively when the assembling pin is engaged with and disengaged from the engaging groove.

3. A fishing reel as claimed in claim 2, wherein the main shaft comprises a head disposed at the front end of the main shaft and a neck for forming the engaging groove after the head, the assembling pin including an end portion having a laterally extending shoulder portion, a lever extending outward from the core, and a hook formed at one side of a middle portion of the lever, the head and the neck of the main shaft completely passing through the winding drum of the spool when the spool is assembled with the housing, the hook being disengaged from the neck when the lever is pivoted in a first pivoting direction, the assembling pin spring pivoting the lever in a second pivoting direction so as to make the hook be engaged with the neck when the lever is released, the second pivoting direction being opposite to the first pivoting direction.

4. A fishing reel as claimed in claim 3, wherein said first means further comprises a cap which includes a ceiling shaped like a dome and a cylindrical side wall integrally connected to a circumference of the ceiling, a part of the cylindrical side wall being cut out to form a gate, the assembling pin being installed pivotal about a pivot pin provided at a front surface of the winding drum, the lever protruding out of the cap through the gate, the assembling pin spring being held between the cylindrical side wall of the cap and the core.

5. A fishing reel as claimed in claim 3, wherein the hook comprises two fingers protruding from the lever and a semi-circular circumference between the two fingers, so that the two fingers and the semi-circular circumference surround at least half of the neck to prevent the hook from being disengaged from the neck.

6. A fishing reel as claimed in claim 1, wherein a first washer is interposed between the shoulder and the sleeve so as to increase a transferred quantity of the frictional force between the shoulder and the sleeve.

7. A fishing reel as claimed in claim 1, wherein the sleeve comprises a cylindrical tube and a flange, the flange being integrally connected to and extending radially outward from a rear end of the cylindrical tube, the cylindrical tube surrounding a central portion of the main shaft, an annular disc plate and a second washer being interposed between the flange and the front surface of the hub, the annular disc plate and the second washer preventing the hub and the plungers from sliding on the flange.

8. A fishing reel as claimed in claim 1, wherein a third washer, a wave washer, and a fourth washer are arranged in series between the plungers and an inner surface of the adjusting knob, the wave washer being elastically deformed in an axial direction of the housing, so as to increase a force transferred in the axial direction from the adjusting knob to the plungers when the adjusting knob is tightened.

9. A fishing reel as claim in claim 1, wherein the hub has a first recess and two first click pin holes, the first recess being formed at a center of the rear surface of the hub, the first click pin holes being formed outside of the first recess at the rear surface of the hub with being diagonally opposed to each other, each first click pin hole containing a first click pin spring and a first click pin urged backward by a biasing force of the first click pin spring,s the adjusting knob having a plurality of first dents formed in an annular arrangement at a front surface of the adjusting knob.

10. A fishing reel as claimed in claim 1, wherein the adjusting knob has a second recess formed at a center of a rear surface of the adjusting knob, the second recess containing a stopper washer fitted around the screw-thread at a rear end of the screw-thread, the stopper washer being fixedly held at its position by a retainer, the stopper washer limiting a range of movement of the adjusting knob in an axial direction of the main shaft.

11. A fishing reel as claimed in claim 1, wherein an annular drag plate is fixedly attached to a peripheral portion of a front surface of the hub, the drag plate having a plurality of second dents formed in an annular arrangement on a front surface of the drag plate, the winding drum having second click pin holes formed at a rear surface of the winding drum, each second click pin hole containing a second click pin spring and a second click pin urged backward by a biasing force of the second click pin spring, the second click pin being engaged with the second dents when the housing and the spool have been assembled with each other.

* * * * *